US011515064B2

(12) United States Patent
Gronowicz, Jr. et al.

(10) Patent No.: US 11,515,064 B2
(45) Date of Patent: Nov. 29, 2022

(54) ANTI-SLIP SYSTEM WITH INJECTION OPERATION

(71) Applicant: Yazaki North America, Inc., Canton, MI (US)

(72) Inventors: William Gronowicz, Jr., Westland, MI (US); Jeffrey Edward Malotke, II, Westland, MI (US); Richard Joseph Exenberger, Plymouth, MI (US)

(73) Assignee: Yazaki North America, Inc., Canton, MI (US)

( * ) Notice: Subject to any disclaimer, the term of this patent is extended or adjusted under 35 U.S.C. 154(b) by 652 days.

(21) Appl. No.: 16/371,721

(22) Filed: Apr. 1, 2019

(65) Prior Publication Data

US 2020/0312489 A1 Oct. 1, 2020

(51) Int. Cl.
*H01B 17/30* (2006.01)
*H01B 7/00* (2006.01)
*H01B 13/00* (2006.01)

(52) U.S. Cl.
CPC ......... *H01B 17/303* (2013.01); *H01B 7/0045* (2013.01); *H01B 13/0013* (2013.01); *H01B 17/306* (2013.01)

(58) Field of Classification Search
CPC .. H01B 17/583; H01B 17/303; H01B 17/306; H01B 13/0013; B60R 16/0222
See application file for complete search history.

(56) References Cited

U.S. PATENT DOCUMENTS

| 4,797,513 A | 1/1989 | Ono et al. |
| 6,438,828 B1 | 8/2002 | Uchiyama |
| 2002/0038715 A1* | 4/2002 | Nakata ................ B60R 16/0222 174/650 |

FOREIGN PATENT DOCUMENTS

JP 10004621 A * 1/1998

* cited by examiner

*Primary Examiner* — Livius R. Cazan
(74) *Attorney, Agent, or Firm* — Foley & Lardner LLP

(57) ABSTRACT

A grommet assembly includes a wire harness and a grommet including a hollow channel configured to receive the wire harness therein. At least one rib extends inwards from and substantially annularly about the interior surface of the hollow channel. At least one port configured to fluidly couple the hollow channel with an exterior environment is defined by the grommet. Material is injected into the channel through the port to secure the grommet relative to the wire harness. The material injected into the channel flows through interstices located between adjacent wires that define the wire harness so as to encapsulate the wires. The injected material also flows into other voids and openings located within the hollow channel. Upon setting, the injected material is configured to prevent movement of the grommet relative to the wire harness and to prevent the passage of contaminants through the grommet assembly.

20 Claims, 8 Drawing Sheets

ANTI-SLIP SYSTEM WITH INJECTION OPERATION

BACKGROUND

Grommet systems may be used to transmit an elongated member through a passageway extending through and defined by a structure that separates two different environments. In such grommet systems, it may be desirable to minimize, limit, or prevent movement of the grommet relative to the elongated member that is to be transmitted through the grommet passageway. Additionally, it may be desirable to minimize or prevent the passage of contaminants between the two environments separated by the structure.

Existing grommet systems for limiting movement of a grommet relative to a member (e.g. a wire harness) pose numerous disadvantages, including: the inability to provide a secure attachment of the grommet and the member via which movement of the grommet relative to the member is minimized or prevented; the specialized tooling requirements involved in the assembly of the grommet system; the low repeatability and low reliability of a proper assembly of the grommet system owing to operator dependence; the inadequate sealing and water wicking provided by current assembly arrangements; etc. Such limitations of existing grommet systems often result in such existing systems being labor, tooling and cost intensive to produce, with the resulting grommet system often additionally failing to meet customer slip testing and contamination requirements.

Given the limitations of existing grommet systems and method of assembling such systems, it would desirable to provide a system configured to minimize, limit or prevent movement of a grommet relative to a member about which the grommet is installed. It would also be desirable to provide a grommet assembly that would be easy and cheap to assemble, and which would not require significant time, skill and/or additional tools or materials to do so.

SUMMARY

One implementation of the present disclosure is a grommet assembly kit including an elongated element defining a first diameter and a grommet. A source of injectable material may also be provided. The grommet includes a body portion, a hollow channel, and a port. The body portion defines a first aperture and a second aperture. A hollow channel extends between the first aperture and the second aperture. The channel is defined by an interior surface of the body portion and is configured to receive the elongated element therein. At least one rib is located on and extends inwards from and substantially annularly about the interior surface of the hollow channel at a location between the first aperture and the second aperture.

The port includes a first opening defined by an exterior surface of the body portion, a second opening, and a passageway extending between the first opening and the second opening. The passageway is configured to fluidly couple the hollow channel with an exterior environment.

In some embodiments, at least a portion of the hollow channel is defined by a second diameter greater than the first diameter. In some embodiments, at least a portion of the hollow channel is defined by a third diameter greater than the third diameter.

In some embodiments, at least of a portion of the hollow channel defined by the third diameter corresponds to a portion of the hollow channel at which a rib is located.

In some embodiments, the second opening of the port is located at a first distance from an axis about which the hollow channel is centered, the first distance being greater than a radius of the elongated element.

In some embodiments, the second opening of the port is defined by a portion of a rib provided on the interior surface of the body portion.

In some embodiments, the second opening of the port is defined by a portion of the rib corresponding to an annular groove defining a filling chamber that extends about an inwardly-most extending portion of an exterior of the rib.

Another implementation of the present disclosure is a grommet including a body portion defining a first aperture and a second aperture. A hollow channel extends between the first aperture and the second aperture and is defined by an interior surface of the body portion. At least one port is defined by the body portion and includes a first opening defined by an exterior surface of the body portion, and a second opening defined by the interior surface of the body portion. A passageway extends between the first opening and the second opening and is configured to fluidly couple the hollow channel with an exterior environment. A first rib extends annularly and substantially uninterruptedly radially inwards from the interior surface of the hollow channel at a first location located between the first aperture and the second opening. A second rib extends annularly and substantially uninterruptedly radially inwards from the interior surface of the hollow channel at a second location located between the second opening and the second aperture. The first rib and the second rib are configured to engage an exterior surface of an elongated member inserted into the hollow channel to form a sealed volume into which material may be transmitted through the at least one port defined by the body portion.

In some embodiments, the grommet further includes a filling chamber extending annularly and substantially uninterruptedly radially outwards from the interior surface of the hollow channel.

In some embodiments, the grommet further includes a third rib extending annularly and substantially uninterruptedly radially inwards from the interior surface of the hollow channel.

In some embodiments, a location of the third rib corresponds to a portion of the hollow channel at which the second opening of the port is located.

In some embodiments, the second opening of the port is defined by a portion of the third rib corresponding to an annular groove defining a filling chamber that extends about an inwardly-most extending portion of an exterior of the third rib.

In some embodiments, the second opening of the port is located at a first distance from an axis about which the hollow channel is centered and an innermost portion of the first rib is located at a second distance from the axis, the first distance being greater than the second distance.

In some embodiments, the grommet includes an engagement structure provide on and extending radially outwards from an exterior surface of the body portion.

Yet another implementation of the present disclosure is a method of providing an anti-slip system. A grommet including a body portion defining a first aperture and a second aperture, and a hollow channel extending between the first aperture and the second aperture is provided. The channel is defined by an interior surface of the body portion. At least one rib is located on and extends inwards from and substantially annularly about the interior surface of the hollow channel at a location between the first aperture and the second aperture. At least one port is defined by the body portion. The port provides fluid communication between the hollow channel and an exterior environment. A wire element is positioned within the hollow channel. A material is injected into the hollow channel through the port.

In some embodiments, the at least one rib includes a first rib extending annularly and substantially uninterruptedly radially inwards from the interior surface of the hollow channel at a location located between the first aperture and the port and a second rib extending annularly and substantially uninterruptedly radially inwards from the interior surface of the hollow channel at a second location located between the second opening and the port.

In some embodiments, the first rib and the second rib are expanded radially outwards during the positioning of the wire element within the channel. In some embodiments, the first rib and the second rib exert a compressive force onto an exterior surface of the wire element within the channel.

In some embodiments, the wire element includes a plurality of wires separated from one another by a plurality of interstices, and wherein the material injected through the port into the hollow channel flows into and substantially fills all of the interstices defined between the wires for at least a portion of the wire element located within the channel.

In some embodiments, the material is injected into the hollow channel at a pressure of between approximately 1 psi and approximately 200 psi.

BRIEF DESCRIPTION OF THE DRAWINGS

FIG. 1.0C is a side, cross-section view of the grommet of the anti-slip assembly of FIG. 10A and a side view of the encapsulated wire harness of the anti-slip system of FIG. 10A, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, an anti-slip assembly generally includes a grommet and a wire harness. A hollow channel defined by the grommet, and through which the wire harness is configured to pass, includes features configured to securely seal the grommet to the wire harness so as to minimize, limit, or prevent movement of the grommet relative to the wire harness, as well as to minimize, limit, or prevent contaminants (including any combination of solid, liquid, and/or gas contaminants) from passing through the anti-slip assembly.

The methods described herein provide improved solutions for assembling an anti-slip system. In particular, the arrangement of the grommet as disclosed herein is configured to allow for a substantially uniform impregnation of material through any and all voids present between the grommet and wire harness, thereby minimizing and/or eliminating water wicking and minimizing the risk of slippage of the grommet relative to the wire harness. Also, as the grommet defines a self-contained mold structure, the need for additional tooling or components (with the exception of an injection element) to secure the grommet to the wire harness is obviated. Additionally, the arrangement of the grommet allows for an automated process to address the precise, predictable, and relatively quick impregnation of material into the space between the grommet and the wire harness, without requiring manual involvement to do so.

Figure 1:
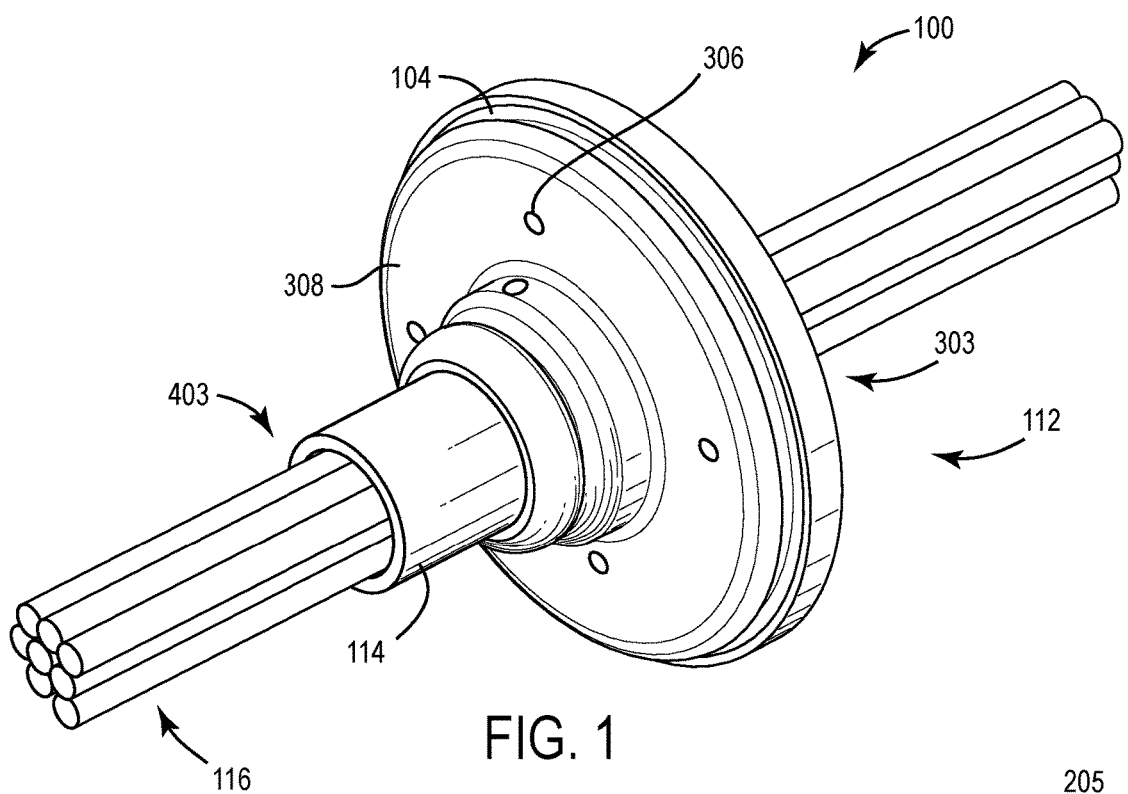
FIG. 1 is a perspective view of an anti-slip system, according to an exemplary embodiment.

Referring now to FIG. 1, an anti-slip system 100 including a grommet 112 and a wire harness 116 according to an exemplary embodiment is shown. In general, grommet 112 defines a channel 114 extending between a first end 303 and a second end 403. As will be described in more detail below, the channel 114 includes one or more features configured to secure the grommet 112 relative to a wire harness 116 extending through the channel 114.

Figure 2:
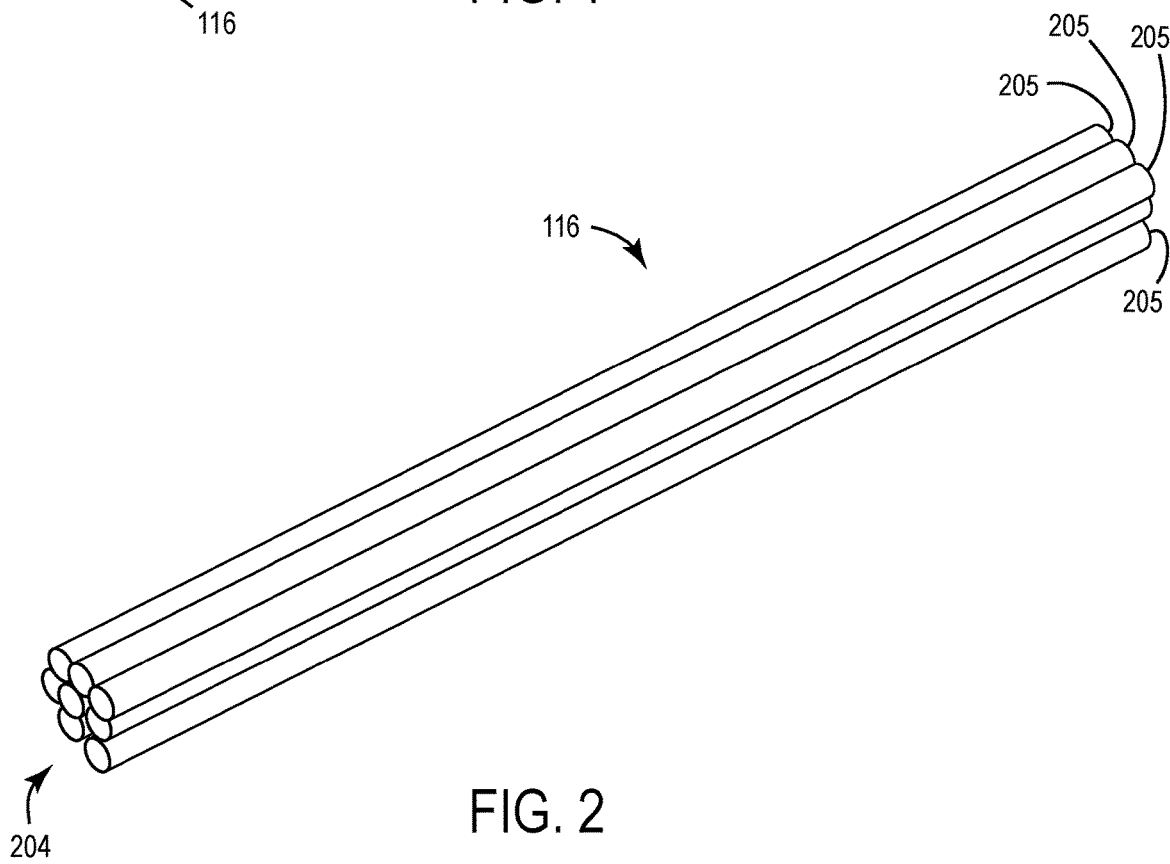
FIG. 2 is a perspective view of a wire harness, according to an exemplary embodiment.

Referring now to FIG. 2, a perspective view of a wire harness 116 is shown according to an exemplary embodiment. The wire harness 116 about which the grommet 112 is mounted may be provided having any desired dimensions, and may be formed of any number or, or combination of, different materials.

As shown in FIG. 2, according to various embodiments, wire harness 116 may be defined by a wire bundle 204 comprising a plurality of wires 205. In some embodiments, additional or fewer wires 205 may be included in the bundle 204 from that illustrated by the embodiment of FIG. 2. In other embodiments, wire harness 116 may be defined by a single wire 205. As illustrated by the wire harness 116 embodiment of FIG. 2, in some embodiments of a wire bundle 204 defined by a plurality of wires 205, the wires 205 may extend co-linearly along the length of the wire harness 116. Alternatively, the wire harness 116 may be defined by any number of other different arrangements, such as, e.g. embodiments such as those illustrated in FIGS. 7A-10C, in which some or all of the wires 205 of the wire bundle 204 are intertwined. In some embodiments, some or all of the wires 205 defining the wire harness 116 may be partially or entirely insulated, coated, or otherwise covered along a portion or an entirety of the length of the wire(s) 205. Additionally, or alternatively, a portion or an entirety of a wire bundle 204 defined by one or more wires 205 may be insulated or coated along a portion or an entirety of the length of the wire bundle 204.

In some embodiments, the wires 205 defining wire harness 116 may be capable of conducting electricity and/or transmitting communication data. In other embodiments, the wires 205 of wire harness 116 may include any number of, and combination of, one or more solid or hollow and metallic or non-metallic tubes or other elongated structures configured to be used to perform and/or provide any number of additional, or alternative, functions, such as, e.g., provide structural reinforcement, fluid transportation, etc.

Referring to FIGS. 3-6, a grommet 112 is shown according to an exemplary embodiment. In general, grommet 112 is defined by a body portion 400 having an exterior surface 412 and an interior surface 414 that defines a hollow channel 114.

The exterior surface 412 of the grommet 112 may be defined according to any number of, and combination of, differing shapes, sizes, features, dimensions, configurations and other characteristics. Provided and/or formed along the exterior surface 412 of grommet 112 may be one or more engagement structures or elements via which grommet 112 may be mounted, attached, installed, or otherwise engaged to an external structure (not shown), As will be understood, according to various embodiments, the grommet 112 may be engaged within a passageway extending from a first surface of an external structure to a second surface of the external structure. In some embodiments, the seal between the grommet 112 and the passageway defined by the external structure may advantageously be a substantially fluid-tight seal configured to limit, minimize or prevent the transmission of contaminants (e.g., oil, dust, water, etc.) between a first environment to which the first surface of the external structure is exposed and a second environment to which the second surface of the external structure is exposed.

Figure 3:
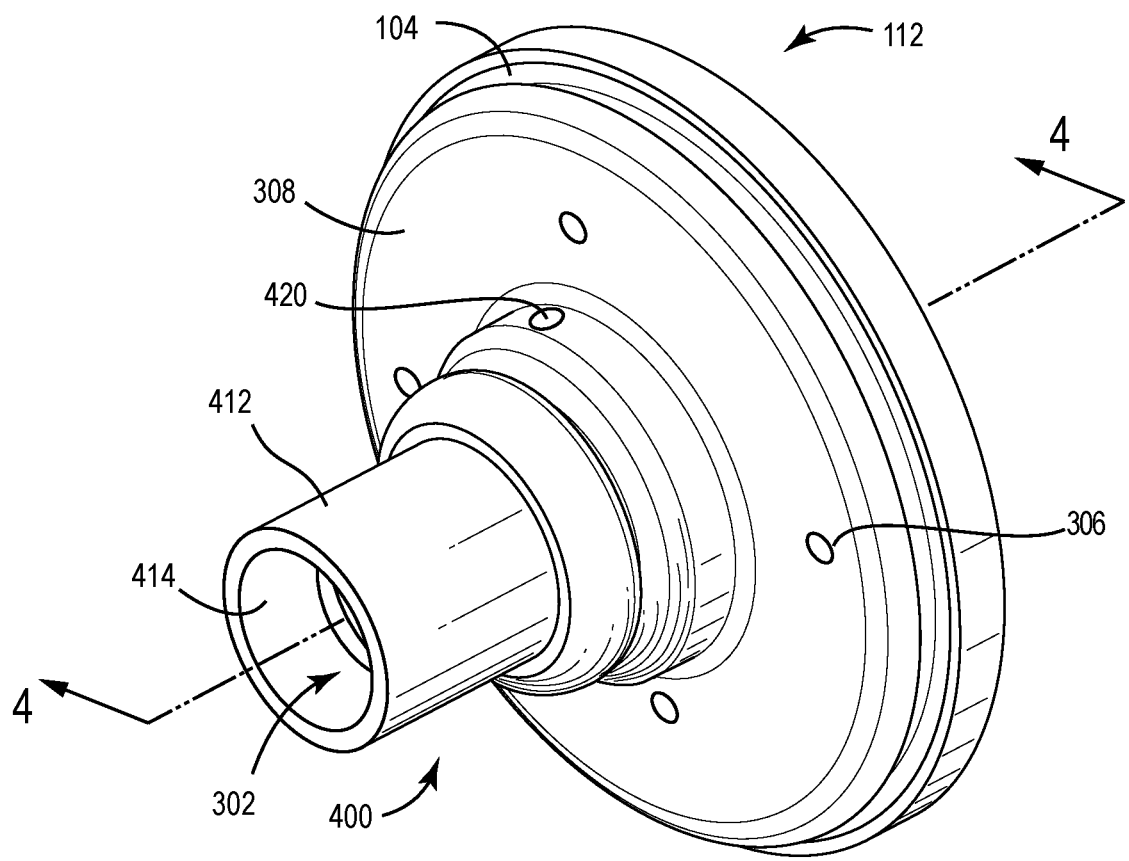
FIG. 3 is a perspective view of a grommet, according to an exemplary embodiment.
Figure 4:
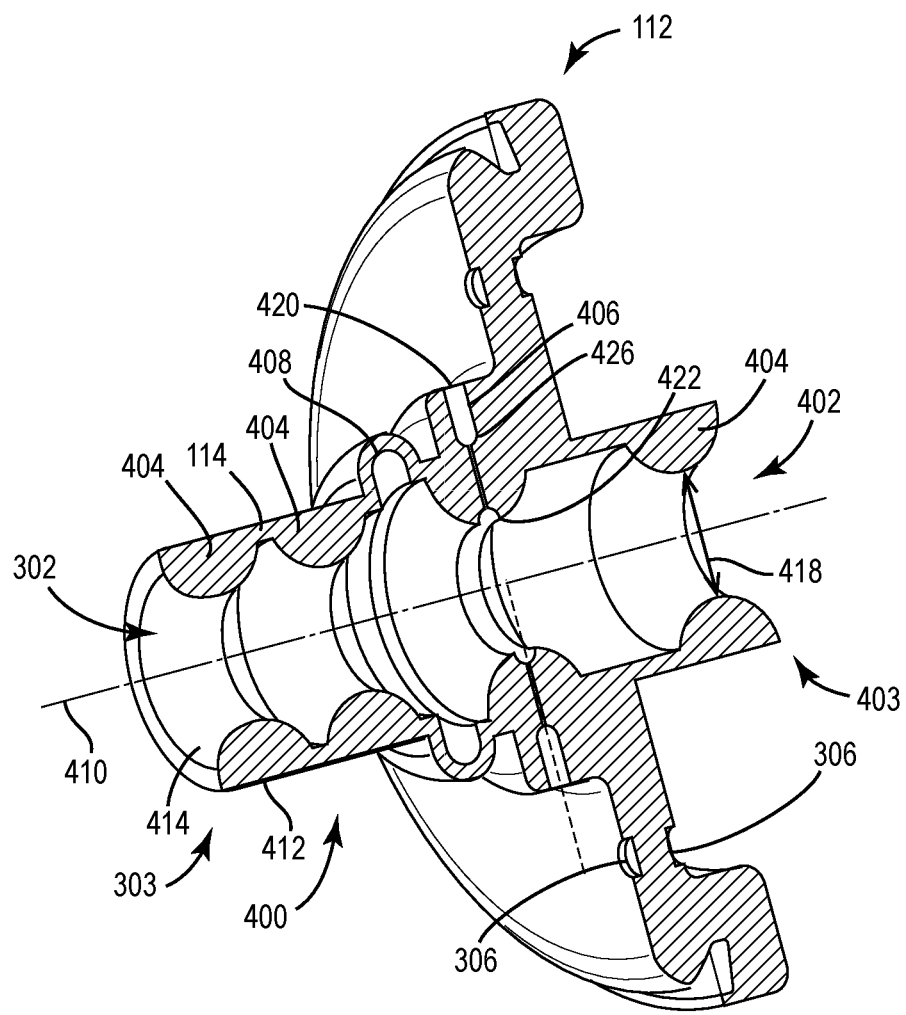
FIG. 4 is a perspective, cross-section view of the grommet of FIG. 3, according to an exemplary embodiment.

The one or more engagement structures and/or elements provided and/or formed about the exterior surface 412 of the grommet 112 may be defined according to any number of, and combination of, known arrangements. For example, in some embodiments, the engagement structure may be defined by a recess or groove 104 extending about a portion of, or the entirety of, the outer circumference of the exterior surface 412 of grommet 112. As shown in FIG. 3, according to various embodiments, the groove 104 may be provided about a support structure 308 extending radially outwards from and about a portion or the entirety of the grommet 112 exterior surface 412. The groove 104 may be formed having a similar shape (e.g., circular, rectangular, etc.) and size as the passageway in the external structure, such that the engagement structure may be press-fit into the external structure passageway. In other embodiments, engagement structure may include any other number of different features, arrangements, or combinations (e.g., hook and loop, adhesive material, snap fit, etc.) via which the grommet 112/anti-slip system 100 may be attached, mounted, or otherwise installed relative to an exterior structure. As shown in FIGS. 1 and 4, the grommet 112 may optionally also include one or more openings in and/or indentations 306 defining thinned-wall portions of the support structure 308 via which wires may be inserted to facilitate the installation of the grommet 112 about the wire harness 116 during assembly of the anti-slip system 100.

Figure 5:
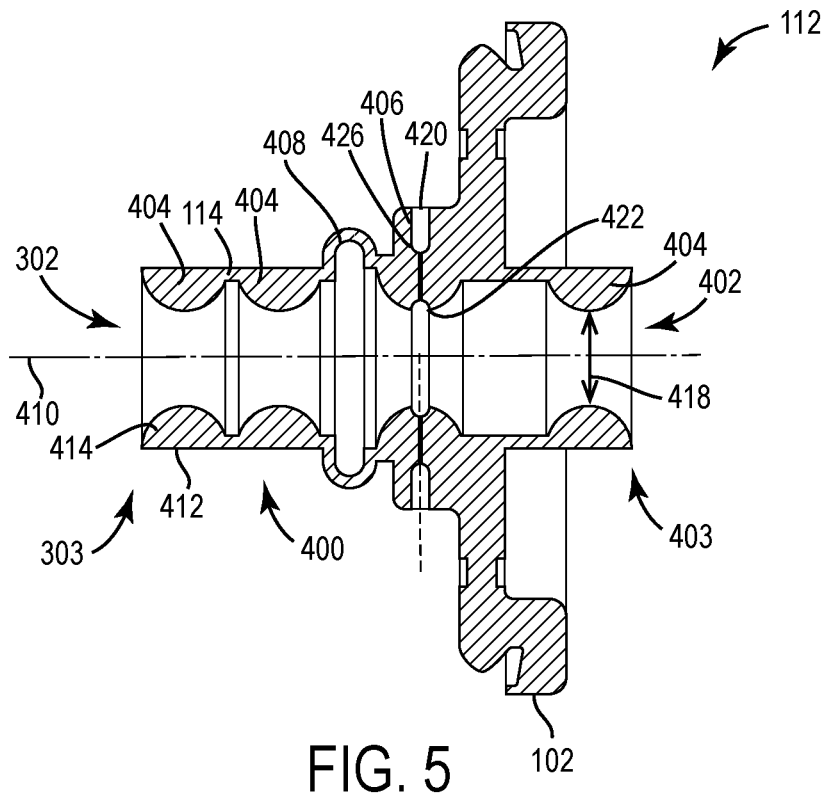
FIG. 5 is a side, cross-section view of the grommet of FIG. 3, according to an exemplary embodiment.

Referring to FIGS. 4 and 5, the interior surface 414 of grommet 112 defines a hollow channel 114 extending between a first aperture 302 provided at a first end 303 of the grommet 112 and a second aperture 402 provided at a second end 403 of the grommet 112. Hollow channel 114 is shown to include internal ribs 404, a port 406, and a filling chamber 408 according to an exemplary embodiment, the functions of which will each be described in greater detail below.

In the embodiment of FIGS. 4 and 5, first aperture 302 and second aperture 402 are shown to include circular cross-sections. In other embodiments, first aperture 302 and/or second aperture 402 may be defined by any other cross-sectional shapes (e.g., square, triangular, etc.). The cross-sectional shape and/or dimensions of the first aperture 302 may be the same or may be different than the cross-sectional shape and/or dimensions of the second aperture 402. In some embodiments, the cross-sectional shape of channel 114 may be similar or the same as the cross-sectional shape of first aperture 302 and/or second aperture 402. In other embodiments, channel 114 may define a different cross-sectional shape (e.g., rectangular, triangular, etc.) than the cross-sectional shape of the first aperture 302 and/or second aperture 402. Additionally, first aperture 302 and second aperture 402 may be formed having dimensions that are generally the same, or which differ, from one another.

The channel 114 is defined between the first aperture 302 and the second aperture 402. In some embodiments, the channel 114 may be centered about an axis 410 about which each of the first aperture 302 and second aperture 402 are centered, such that the first aperture 302, channel 114 and second aperture 402 are generally aligned between the first end 303 to the second end 403 of the grommet. In other embodiments, any or all of the first aperture 302, second aperture 402, and/or the channel 114 may be centered about and extend along differing axes.

The interior surface 414 of grommet 112 may be defined by one or more radially inwards extending internal ribs 404 and/or one or more radially outwardly extending filling chambers 408. Accordingly, as illustrated by FIGS. 4 and 5, a diameter of the channel 114 as measured radially outward from an axis about which the channel 114 extends (such as, e.g. axis 410 in the embodiment of FIGS. 4 and 5) and the interior surface 414 of the grommet 112 may vary between first end 303 and second end 403 of the grommet 112. As will be understood, the diameter of the channel 114 along the length of the grommet 112 may vary depending on the number, sizing, spacing, configuration and arrangement of the internal ribs 404 and/or filling chambers 408 provided along/defined by the interior surface 414, as well as on the overall thickness, dimensions, and configuration of the wall defining the body portion 400 of the grommet 112 that is defined between the interior surface 414 and exterior surface 412 of the grommet 112. In some embodiments, the changes in diameter along the length of the channel 114 as defined between the first end 303 and the second end 403 may follow a uniform or semi-uniform pattern of varying diameters, while in other embodiments the changes in diameter along the length of the channel 114 may be non-uniform.

Referring to FIGS. 4 and 5, grommet 112 is shown to include three internal ribs 404 extending radially inward from the interior surface 414 according to an exemplary embodiment. According to other embodiments, grommet 112 may include any other number of one or more ribs 404 provided along the interior surface 414 of the grommet 112.

Figure 6:
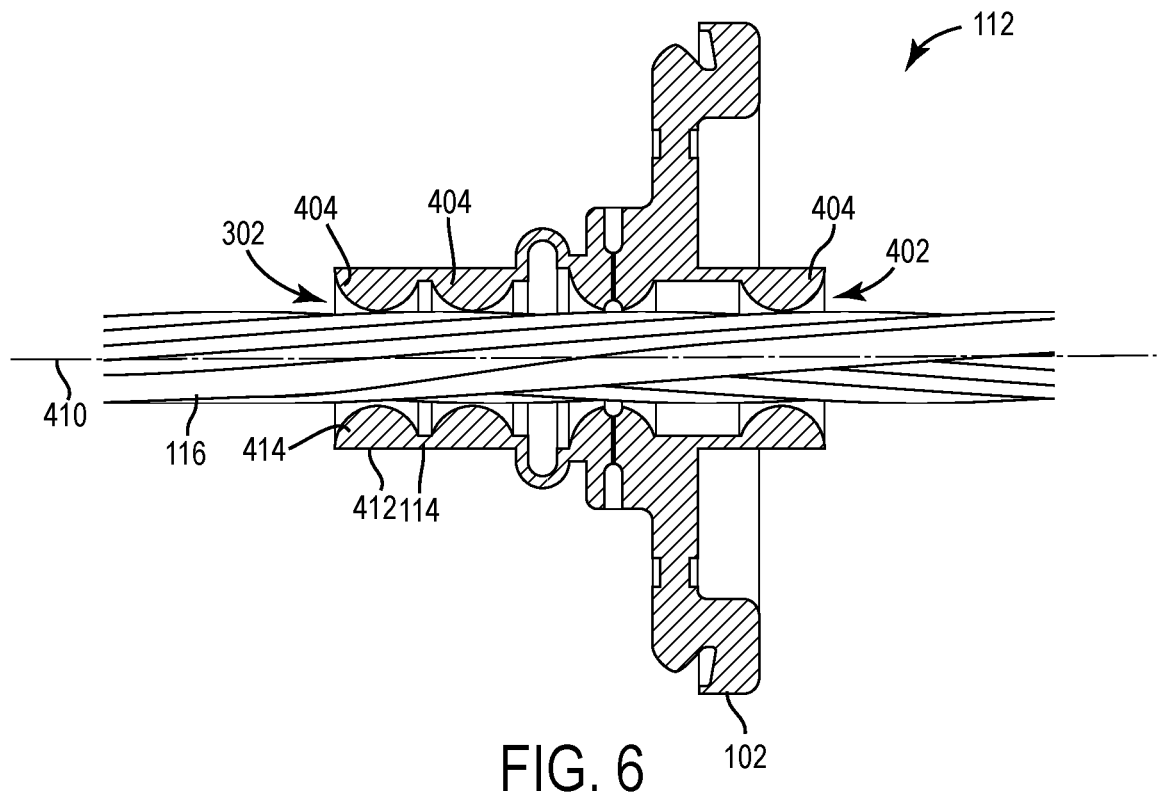
FIG. 6 is a side, cross-section view of the grommet of FIG. 3 installed on a wire harness, according to an exemplary embodiment.

According to various embodiments, some or all of the ribs 404 may extend around an entirety or a portion of the circumference of interior surface 414, such that an outermost diameter of ribs 404 generally corresponds to a diameter defined by the interior surface 414. As illustrated in FIGS. 5 and 6, ribs 404 are shown to define an innermost diameter measured radially outward from axis 410 that is smaller than a diameter measured radially outwards from the axis 410 to the interior surface 414 of the grommet 112. In some embodiments, some or all of the ribs 404 may each define different or similar diameters. In other embodiments, ribs 404 may include any combination of diameters (e.g., two internal ribs of the same diameter and two internal ribs of two different diameters). As shown in FIGS. 5 and 6 in some embodiments, at least one rib 404 may be located adjacent the first aperture 302 and/or at least one rib 404 may be located adjacent second aperture 402. In some such embodiments, the rib 404 located adjacent the first aperture 302 and the rib 404 located adjacent the second aperture 402 are each configured to define substantially the same innermost diameter.

As illustrated in FIGS. 5 and 6, according to various embodiments, internal ribs 404 may be defined by rounded structures that extend annularly about the entirety of the interior surface 414 defining the hollow channel 114. According to other embodiments, some or all of the internal ribs 404 may be defined having any other shapes, sizes, configurations, or arrangements. Additionally, although ribs 404 are shown as defining solid structures, according to some embodiments (not shown), some or all of the ribs 404 may be formed with one or more internal channels (not shown) extending between a rib 404 front surface facing towards the first end 303 of the grommet 112 and a rib 404 rear surface facing toward the second end 403 of the grommet 112. In such embodiments, material that flows into and solidifies within these one or more internal channels may be configured to prevent an outwards, radial displacement of the grommet 112 relative to the wire harness 116 during use of the anti-slip system 100, thereby providing additional securement of the mounting of the grommet 112 relative to the wire harness 116. As will be understood, according to various embodiments in which channels are provided in one or more of the internal ribs 404 of the grommet, such channels may be omitted from any rib 404 located immediately adjacent first aperture 302 and/or any rib 404 located immediately adjacent second aperture 402.

In addition to, or as an alternative to, optionally provided channels extending through one or more internal ribs 404, according to some embodiments, the exterior surface of one or more ribs 404 may optionally also be formed with one or more axially extending grooves, such that the diameter of the rib 404 is varied about its circumference. In such embodiments, external material that flows into and solidifies within such grooves may be configured to prevent a rotational displacement of the grommet 112 relative to the wire harness 116, thereby providing additional securement of the mounting of the grommet 112 relative to the wire harness 116.

As will be understood, in embodiments incorporating internal channels and/or external grooves, in addition to preventing radial and/or rotational movement of the grommet 112 relative to the wire harness (on top of the limitation/prevention of axial movement provided by the internal ribs 404), such internal channels and/or external grooves may facilitate the flow of material from the port 406 towards the first aperture 302 and the second aperture 402 during the filling of the hollow channel 114 with material.

According to some embodiments, internal ribs 404 may be formed monolithically with the interior surface 414 of the grommet 112 body portion 400 that defines hollow channel 114, so as to form a unitary, monolithic grommet structure. In other embodiments, internal ribs 404 may be formed integrally with the grommet 112 body portion 400 from a similar or a different material, as that used to form the grommet 112 body portion 400. In yet other embodiments, internal ribs 404 may be formed of an external component (e.g., O-ring, etc.) configured to be attached to and installed within hollow channel 114.

As noted above, according to various embodiments, grommet 112 may optionally, or alternatively, include one or more radially outwardly extending filling chambers 408 defined by the interior surface 414. Referring to FIGS. 5 and 6, in some embodiments, filling chamber 408 may be formed having an annular shape. In other embodiments, some or all of the provided filling chambers 408 may include different diameters and/or different shapes, sizes, configurations and/or arrangements.

In some embodiments, the thickness of a wall of the body portion 400 of the grommet 112 defined between the exterior surface 412 and the interior surface 414 may vary along those portions at which a filling chamber 408 is provided. In some such embodiments, the exterior surface 412 of the grommet 112 at those locations at which a filling chamber 408 is provided may define an outer diameter that is substantially the same as the diameter of the portions of the exterior surface 412 of the grommet 112 at which no filling chamber 408 is provided, with the thickness of the body portion 400 of the grommet 112 accordingly being greater in those portions of the grommet 112 at which no filling chambers 408 are provided. In other embodiments, the thickness of a wall of the body portion 400 of the grommet 112 defined between the exterior surface 412 and the interior surface 414 may remain substantially e same at those locations at which an internal filling chamber 408 is formed. In such embodiments, such as, e.g. the embodiment illustrated in FIGS. 5 and 6, the exterior surface 412 of the grommet 112 may resultantly include portions along the length of the grommet 112 having an increased diameter.

As shown in FIGS. 4 and 5, grommet 112 includes port 406 located between the first end 303 and the second end 403. In general, port 406 is configured to fluidly connect channel 114 with an environment exterior to the grommet 112. As shown in FIGS. 4 and 5, in some embodiments, grommet 112 may optionally include one or more additional ports 406 located at the same axial location relative to axis 410 and around the circumference of channel 114. In other embodiments, grommet 112 may include one or more additional ports 406 located at different axial locations relative to axis 410. According to some embodiments, one or more of the additionally provided ports 406 may optionally be used as a vent through which air trapped within the channel 114 may flow out of during the injection of material into the channel 114 according to any of the methods described below. Alternatively, or additionally, according to other embodiments, one or more vent structures may be provided via which air may escape from the channel 114. According to other embodiments, no additional vent structure and/or port 406 is provided via which air may flow out of the channel 114. As will be understood, according to various embodiments, the grommet 112 may be provided with a single port 406.

Referring to FIG. 5, port 406 is shown to be defined between a first port aperture 420 and a second port aperture 422 according to an exemplary embodiment. First port aperture 420 is shown to be located on exterior surface 412, and second port aperture 422 is shown to be in fluid communication with interior surface 414. In some embodiments, second port aperture 422 may be located on interior surface 414. In other embodiments, the second port aperture 422 may be located on a rib 404 or on a filling chamber 408 provided along the interior surface 414. For example, as shown in FIGS. 5 and 6, according to some embodiments, the second port aperture 422 may be provided along a filling chamber 408 that is formed about a rib 404 provided on interior surface 414.

First port aperture 420 and second port aperture 422 are configured to define a channel 426 extending substantially perpendicular to axis 410 according to an exemplary embodiment. In other embodiments, channel 426 may not be perpendicular to axis 410, and may instead extend through the body portion 400 of the grommet 112 at any other angle, or combination of angles (e.g., at 45 degrees from axis 410, etc.). As will be described in greater detail below, port 406 may be configured to engage or accept an injection element, via which material from exterior environment may be flowed or otherwise transmitted into channel 114.

Figure 7A:
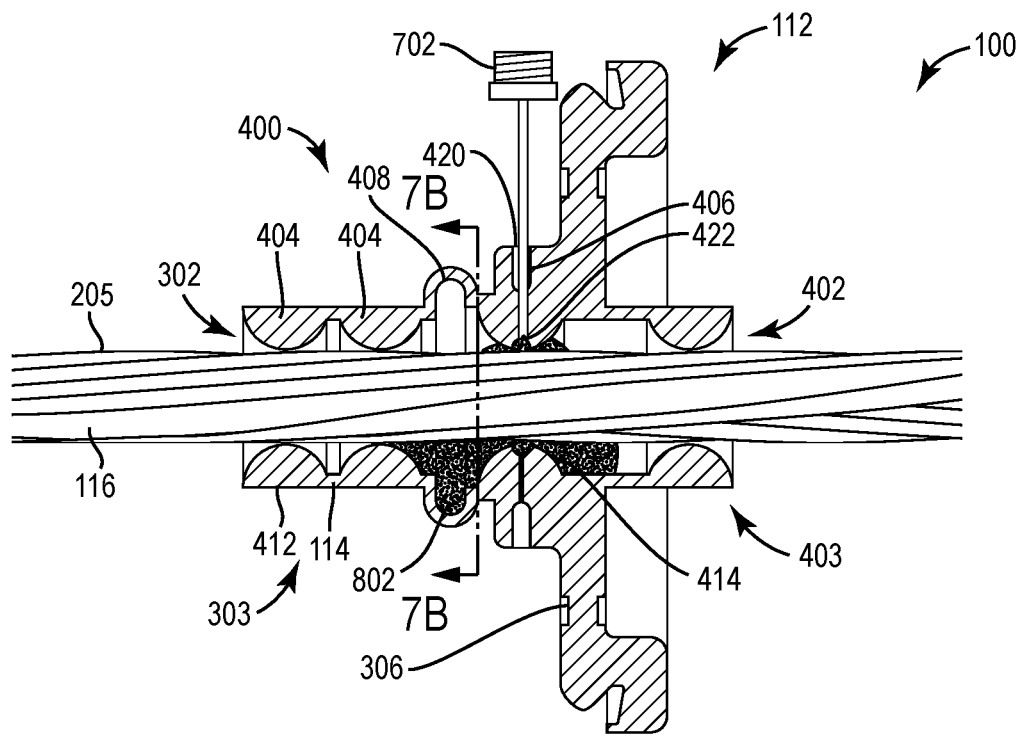
FIG. 7A is a first side, cross-section view of the grommet and harness assembly of FIG. 6 illustrating the commencement of the assembly of the anti-slip system, according to an exemplary embodiment.

As noted above, according to various embodiments, the port 406 may be formed in the grommet 112 body portion 400 at a location corresponding to a location at which an internal rib 404 is provided along the interior surface 414. In some such embodiments, the second port aperture 422 may be defined along any portion of the exterior surface of the rib 404. As shown in FIG. 7A, in some such embodiments, an internal filling chamber 408 may optionally be formed about the rib 404 at a location corresponding to the port 406, such that the second port aperture 422 is defined within the rib 404 at a location corresponding to the filling chamber 408. In embodiments in which the anti-slip system 100 is formed by injecting material 802 into the channel 114, the presence of the filling chamber 408 underneath the second port aperture 422 provides a space in which material injected through the port 406 may be collected prior to seeping into the voids, spaces or other interstices defined by the wires 205 of the wire harness 116. By providing such a collection space, the arrangement of the second port aperture 422 in an internal filling chamber 408 defined within a rib 404 may advantageously prevent material from building up within the port channel 426 during the anti-slip system 100 assembly process.

It should be noted that the structural arrangement, configuration, spacing, dimensions, shape, etc. of each component between first end 303 and second end 403 of grommet 112 as illustrated in and/or described with reference to any of the FIGURES provided herein, or as described in any the exemplary embodiments discussed herein, is not limiting.

Referring now to FIGS. 7A-10C, a method of providing an anti-slip system 100 configured to minimize, limit, or prevent movement of grommet 112 relative to a wire harness 116 (or any other type of assembly or element about which grommet 112 may be attached) is shown according to an exemplary embodiment. The examples described herein are not intended to be limiting. The method described herein may be used with other devices, components, elements, or bodies not explicitly described herein.

Referring to FIG. 7A, assembly of the anti-slip system 100 begins with the installation of wire harness 116 through the channel 114 of grommet 112. In embodiments incorporating one or more indentations 306 defining thinned-wall portions of and/or openings in the support structure 308, the serviceability of the grommet 112 during installation of the wire harness 116 through the channel 114 may be increased by mounting the grommet 112 about one or more wires that are pierced through the thinned-wall portions of the support structure 308 defined by the indentations 306 and/or are inserted through the openings formed in the support structure 308. According to some embodiments, an exterior diameter of the wire harness 116 may be equal to or greater than a narrowmost portion of the channel 114, such that at least a portion of the one or more ribs 404 provided along grommet 112 interior surface 414 contact the exterior of the wire harness 116 when the grommet 112 is positioned about the wire harness 116.

According to some such embodiments, the wire harness 116 may advantageously have a diameter that is slightly greater than a narrowest portion of the channel 114 when the grommet 112 is in an unstressed, pre-attachment configuration, such that the installation of the grommet 112 about the wire harness 116 results in the radially outward displacement of the internal ribs 404 of the grommet 112 (the innermost surfaces of which define the narrowmost portion of the channel 114). As a result, upon installation of the grommet 112 about the wire harness 116, some or all of the ribs 404 exert a compressive force onto an exterior of the wire harness 116. In some embodiments, the degree of the compressive force exerted by some or all of the internal ribs 404 onto the wire harness 116 may be configured to be capable of limiting or completely preventing the movement of grommet 112 along axis 410 relative to wire harness 116.

Although in various embodiments each of the internal ribs 404 may define openings of similar sizes and/or may be formed having similar degrees of resiliency so as to exert a generally uniform compressive force onto the exterior surface of a wire harness 116, in other embodiments, some or all of the ribs 404 may be formed defining different sized openings and/or having differing resiliencies, such that the force exerted onto the exterior of the wire harness 116 vary along the length of the grommet 112. For example, in some embodiments, the ribs 404 located adjacent to first aperture 302 and second aperture 402 may be configured to be less resilient and/or define smaller innermost diameters than one or more additional ribs 404 located in between the first end 303 and second end 403 of the grommet 112, such that ribs 404 located adjacent to first aperture 302 and second aperture 402 limit the movement of the grommet 112 relative to the wire harness 116 and generally define a sealed chamber between the first end 303 and second end 403 of the grommet 112.

In yet other embodiments, an exterior diameter of wire harness 116 may be smaller than the narrowest portion of the channel 114, such that the wire harness 116 may be easily slid into and through the channel 114. As will be understood, in such embodiments, the securement of the grommet 112 relative to the wire harness 116 may be provided exclusively via the material that is flowed into the channel 114 during assembly of the anti-slip system 100 according to any of the methods described below.

According to various embodiments, the grommet 112 may be provided with any number of, or any combination of characteristics or features configured to assist in installing the wire harness 116 through the channel 114 of the grommet 112. For example, according to various embodiments, the grommet 112 may be formed of an elastic material that allows the grommet 112 to resiliently expand to accept a wire harness 116, and which may subsequently substantially contract back to its initial size once the wire harness 116 has been installed. According to some embodiments, the grommet 112 may optionally also, or alternatively, include a slit (not shown) extending through the grommet 112 body portion 400 from the exterior surface 412 to the interior surface 414, and between a portion of the grommet 112 between the first end 303 and the second end 403 to facilitate installation of the grommet 112 about a wire harness 116.

Referring to FIG. 7A, an injection element 702 (e.g., needle, syringe, etc. is shown to enter port 406 through first port aperture 420 following the installation of wire harness 116 through hollow channel 114, according to an exemplary embodiment. Injection element 702 may be configured to transmit a material 802 from an external environment into the channel 114 of the grommet 112 via port 406. As will be understood, material 802 may comprise a flowable material of any desired viscosity that is configured to harden, cure, set, or otherwise solidify, such as, e.g., an epoxy, a resin, a rubber, etc.

In some embodiments, the solidified material 802 is configured to serve as only a physical barrier against movement of the grommet 112 relative to the wire harness 116 and/or as a barrier against the passage of contaminants. In other embodiments, the material 802 may advantageously have adhesive or other binding or bonding properties, such that, in additional to the physical barrier provided by the solidified material 802, the material 802 also may serve to limit movement of the grommet 112 relative to the wire harness 116 via an adhesive or chemical attachment or bond between the grommet 112 and the wire harness 116.

Injection element 702 is shown to define a diameter according to an exemplary embodiment. The diameter of the injection element 702 is shown to be less than a diameter of the first port aperture 420 but greater than a diameter of the second port aperture 422. In some embodiments, the diameter of the injection element 702 may be greater than the diameter of the first port aperture 420. As will be understood, any number of known nozzles or injection arrangements may be used. As will also be understood, in embodiments in which more than one ports 406 is provided along and extends through the grommet 112 body portion 400, one or more injection elements 702 may be used to simultaneously, or sequentially, inject material 802 into the channel 114 via some or all of the ports 406.

Referring to FIGS. 7A-10C, a method of injecting material into the hollow channel so as to effectuate attachment of the grommet 112 to the wire harness 116 to define an anti-slip system 100 is shown according to one embodiment. As shown in FIGS. 7A and 7B, following an initial insertion of the injection element 702 into port 406, the injection element 702 is configured to inject a material 802 under low pressure and/or low flow rate into channel 114. According to various embodiments, the material 802 may be injected into channel 114 at any desired pressure, such as, e.g., pressures of between approximately 1 psi and approximately 400 psi. Alternatively, according to other embodiments, the material 802 may be injected under any other desired constant or variable pressure(s) and at any desired flow rate. As noted above, according to various embodiments, one or more additional injection elements 702 may also be inserted into any additional, optionally provided ports 406 defined along the grommet 112 to also deliver material 802 into the channel 114. In embodiments in which any additionally provided ports 406 are not used to deliver material into the channel 114 (such as, e.g. illustrated in TWIGS. 7A-9), a plug or other sealing element (not shown) may optionally be inserted into or over the port 406 to prevent seepage or leaking of material 802 therethrough.

Figure 7B:
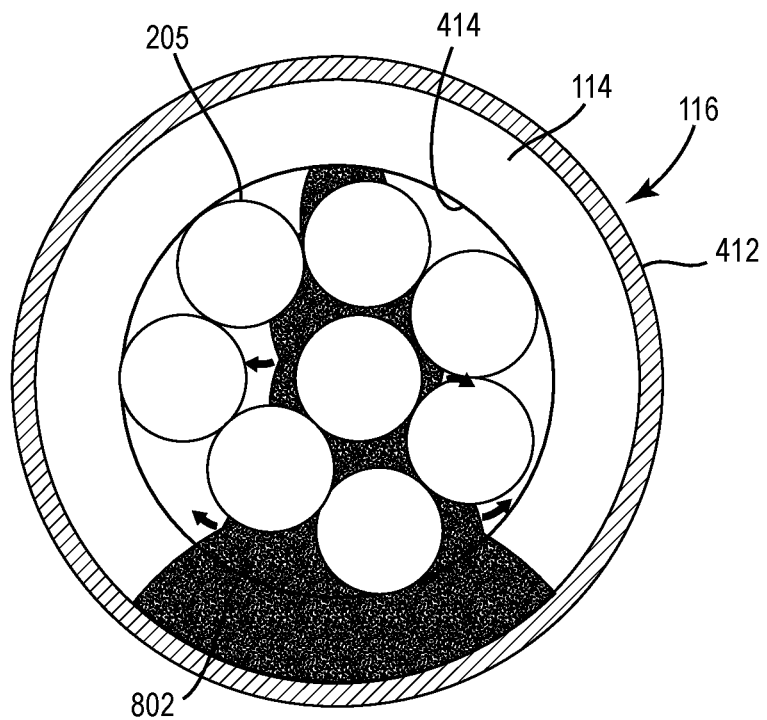
FIG. 7B is a front, cross-section view taken along line 7B-7B of FIG. 7A illustrating the flow of material through the grommet and wire harness assembly during the assembly of the anti-slip system, according to an exemplary embodiment.

As illustrated by the arrows of FIGS. 7A and 7B, by injecting the material under low pressure, as material 802 is injected into the hollow channel 114 through the one or more ports 406, the material 802 is provided with sufficient time during which the material 802 may slowly seep into and make its way into and through the spaces, interstices, openings, or other voids defined between adjacent wires 205 defining the wire bundle 204 that are generally located in the area underneath the second port aperture 422, thereby allowing the material 802 to fully encapsulated the wires 205 and fill in the various other voids provided underneath the grommet 112.

Figure 8:
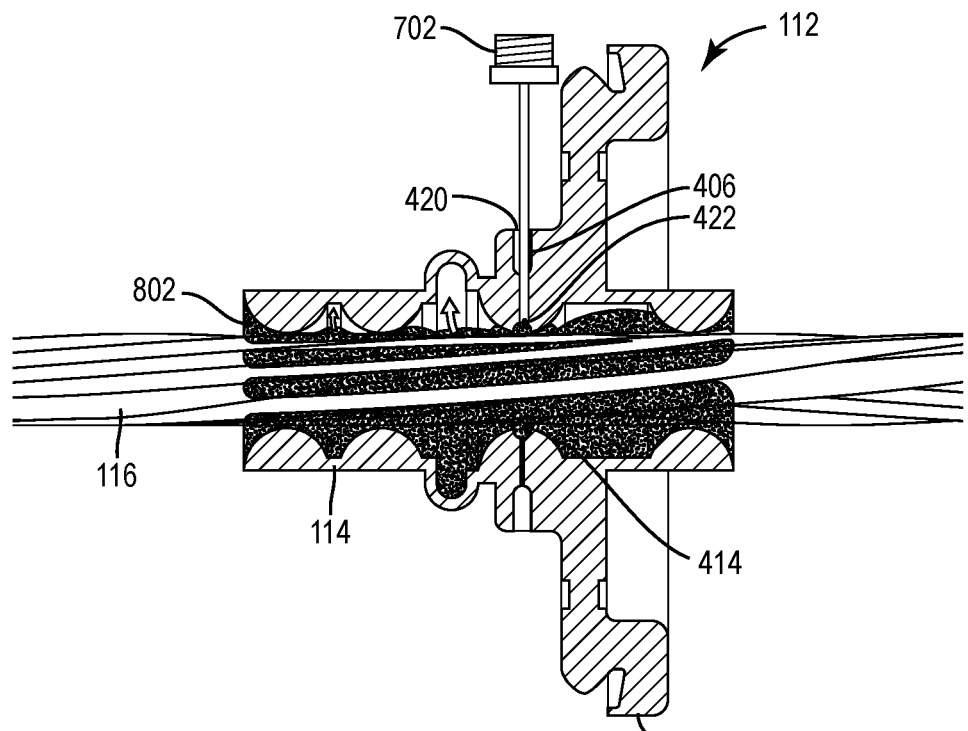
FIG. 8 is a second side, cross-section view of the grommet and harness assembly of FIG. 6 during assembly of the anti-slip system, according to an exemplary embodiment.

As the voids defined between the wires 205 of the wire bundle 204 located adjacent the one or more ports 406 are filled with material 802, material 802 continues to flow outwards towards the first end 303 and second end 403 of the grommet 112. As shown in FIG. 8, in additional to filling the voids between adjacent wires 205, the material 802 also begins to fill the spaces defined between the exterior of the wire harness 116 and adjacent ribs 404, as well as the spaces defined by any filling chambers 408 defined by the interior surface 414 and/or other void (e.g. channels and/or grooves provided in ribs 404, etc.) present in the channel 114.

Figure 9:
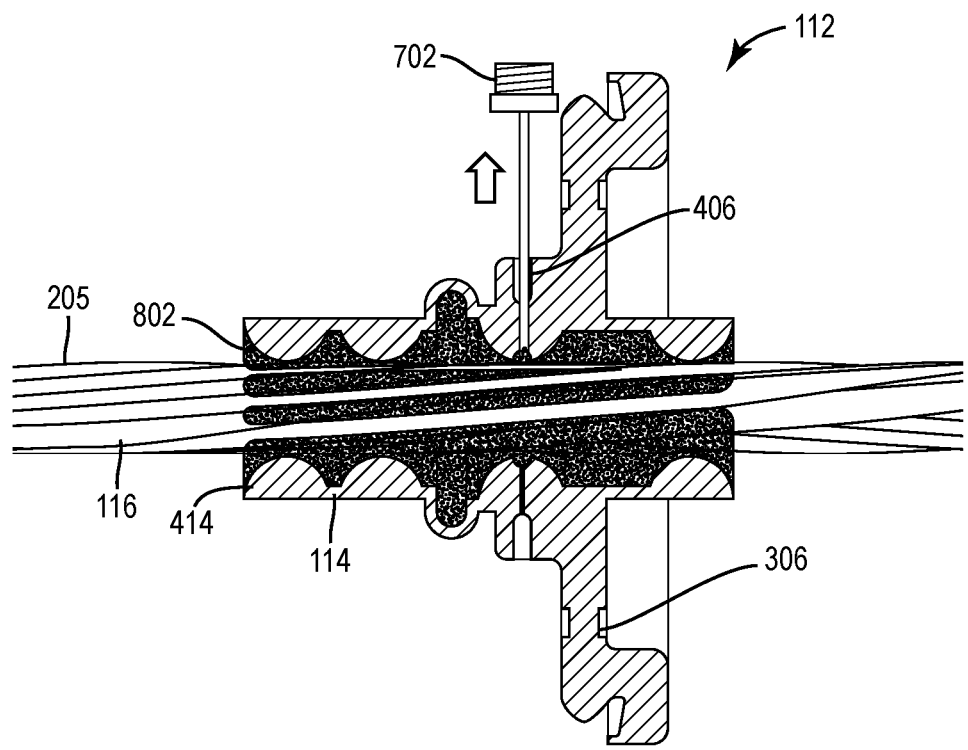
FIG. 9 is a side, cross-section view of the illustrating the removal of an injection element from the grommet and harness assembly of FIG. 6 following the conclusion of the assembly of the anti-slip system, according to an exemplary embodiment.

As shown in FIG. 9, once material 802 has filled the voids within the hollow channel 114 (including the spaces defined by filling chambers 408, spaces defined between the exterior of the wire harness 116 and the interior surface 414 of the grommet 112, spaces between adjacent internal ribs 404, spaces between adjacent wires 205 of the wire bundle 204, etc) and thus encapsulated the portions of the individual wires 205 located within the grommet 112, the injection element 702 is removed from the port 406.

Figure 10A:
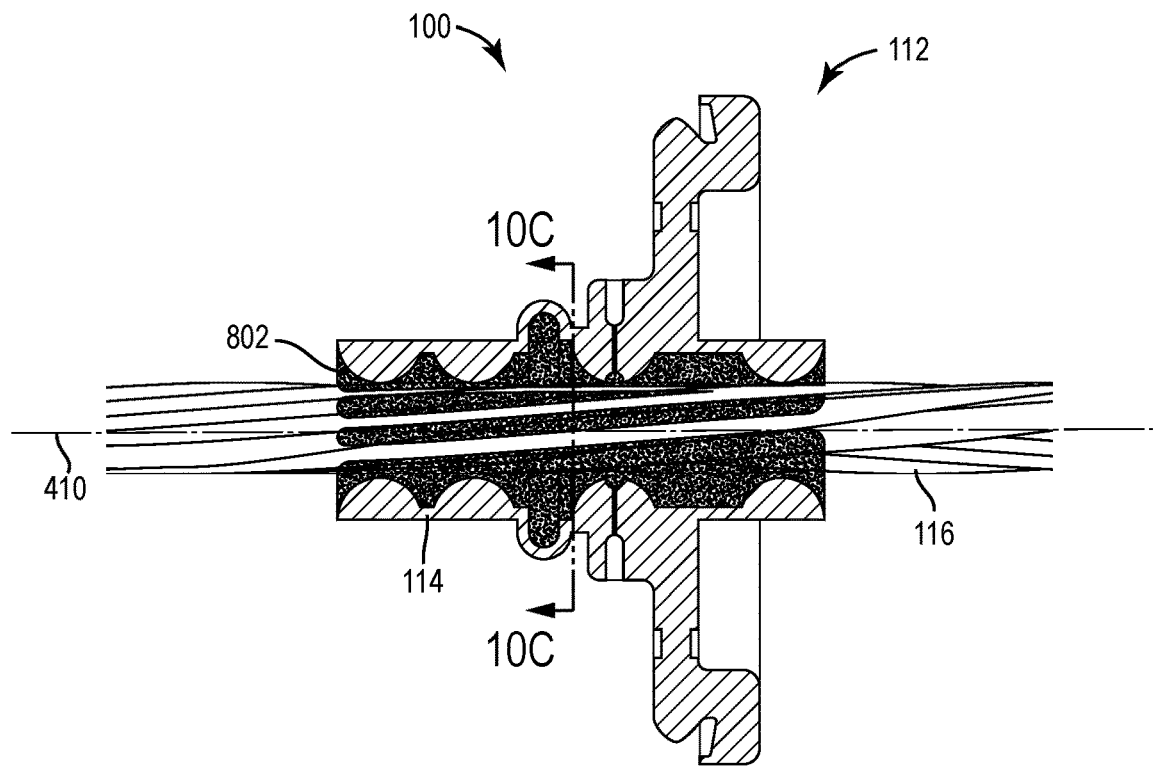
FIG. 10A is a side, cross-section view of the anti-slip system of FIG. 9 following the removal of the injection element, according to an exemplary embodiment.

Referring to FIGS. 10A-1.0C, the completed anti-slip system 100 is shown according to an exemplary embodiment. As shown in the cross-sectional view of FIG. 10A, material 802 is shown to have encapsulated the wires 205 and filled the voids defined within the hollow channel 114, thus coupling (e.g. physically, adhesively, chemically, etc.) the grommet 112 to wire harness 116. As will be understood, the presence of set, cured, hardened or otherwise solidified material 802 in the voids that had previously been defined within the channel 114 is configured to serve as a physical barrier that limits, minimize, or prevents movement of the grommet 112 relative to the wire harness 116. Additionally, in embodiments in which the innermost surface of the interior surface 414 (defined by an innermost surface of some or all of the ribs 404) of the channel 114 is smaller than an outer most surface of the wire harness 116, the compressive force exerted by the ribs 404 onto the wire harness 116 may also be capable of limiting or completely preventing movement of grommet 112 along axis 410 and relative to wire harness 116.

Figure 10B:
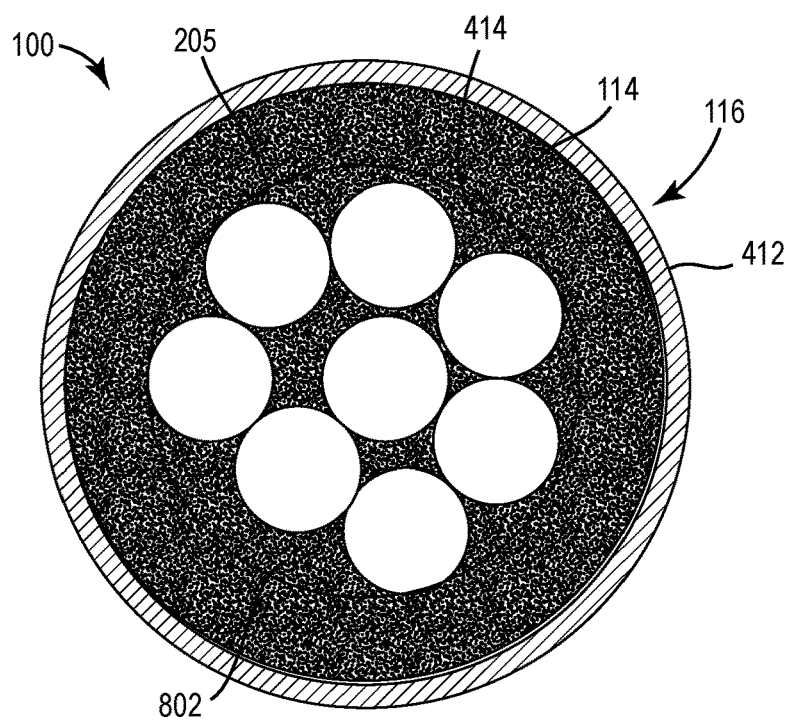
FIG. 10B is front, cross-section view of the anti-slip system taken along line 10B-10B of FIG. 10A, according to an exemplary embodiment.
Figure 10C:
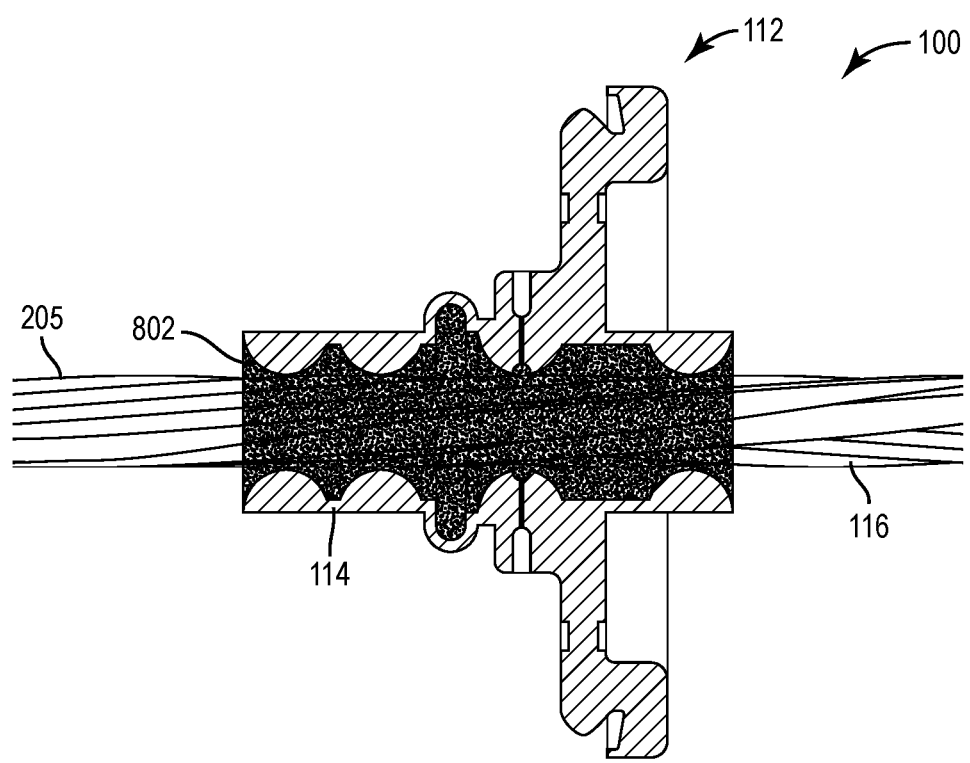

In addition to securing a grommet 112 in place, as illustrated by FIG. 10B and FIG. 10C (which depicts a side view of the wire harness 116 and a cross-sectional view of the grommet 112), the encapsulated wires 205 of the wire bundle 204 form a seal configured to limit, minimize, or prevent transmission of contaminants (e.g., water, dust, sand, etc.) through hollow channel 114.

According to some embodiments, during the steps of injecting material 802 into the hollow channel 114, blocking elements (e.g. adhesive tape, a plug, etc.) may optionally be provided at one or both of the first aperture 302 and the second aperture 402 to prevent excess material 802 from flowing out of the grommet 112 during the assembly of the anti-slip system 100. Additionally, or alternatively, in embodiments in which the grommet 112 is provided with one or more slits (not shown), the slits may optionally be taped or otherwise covered during the assembly of the anti-slip system 100 to prevent or minimize uncured material 802 from flowing there through. Additionally, or alternatively, in some embodiments in which one or more slits are provided, the slits may advantageously be provided along a similar portion of the grommet 112 about which the port 406 is provided, such that the port 406 and the slit are generally oriented in a similar direction.

Although the method of assembling the anti-slip system 100 described with reference to 7A-10C has been described as using low pressure injection of material 802 into the hollow channel 114, it is to be understood that in other embodiments, such as, e.g., in situations where minimizing the transmission of contaminants is not a concern, and therefore a filling of all of the voids with the hollow channel 114 (e.g. the filling of all of the voids defined between adjacent wires 205 of wire bundle 204) is not required, material 802 may injected through the port 406 at higher pressures. In such embodiments, the incorporation of one or more flow channels through the internal ribs 404 and/or the incorporation of one or more grooves formed about the external surfaces of ribs 404 may prevent a pressure build-up of material 802 by allowing for an easier dispersal of material 802 through and within the hollow channel 114.

Also, although the methods described herein have been described with reference to the attachment of a grommet 112 onto a wire harness 116 defined by a plurality of initially exposed, unencapsulated wires 205, it is to be understood that in some embodiments, the grommet 112 disclosed herein may be attached using similar methods to wire harnesses 116 defined by a single wire 205 and/or wire harness 116 defined by a plurality of wires 205 that are encapsulated to define a continuous, uninterrupted wire harness 116 outer surface. In some such embodiments, in order to allow for material 802 to fill the hollow channel 114, some or all of the internal ribs 404 may be provided with one or more axially extending channels and/or grooves formed about an external surface of some or all of the ribs 404, so as to allow material 802 to flow through the channel 114.

In some embodiments, the hollow channel 114 may be formed with ribs 404 provided only adjacent the first aperture 302 and the second aperture 402, with these ribs 404 being configured to sealingly engage the outer surface of the wire harness 116 and thus define a chamber into which the material 802 may be provided. In some such embodiments, one or more additional internal ribs 404 may be provided between the first end 303 and the second end 403 of the grommet 112. According to some such embodiments, these additional one or more ribs 404 may be formed defining openings that are greater than the exterior of the wire harness 116, such that material 802 may be able to flow through the gaps between the innermost surfaces of these ribs 404 and the exterior of the wire harness 116, so as to flow through and fill the channel 114. In other such embodiments, some or all of the ribs 404 may alternatively, or additionally be provided with channels extending there through and/or with grooves formed on an exterior thereof, so as to also facilitate the flow of material 802 towards the first end 303 and the second 403 of the grommet 112. As will be understood, in such embodiments in which the ribs 404 include channels and/or grooves, the openings defined by the ribs 404 may be smaller, equal to, or larger than the exterior of the wire harness 116.

In yet other embodiments, the one or more ribs 404 located inwards from the ribs 404 provided at the first end 303 and the second end 403 of the grommet 112 may alternatively, or additionally be formed having a greater resiliency than the ribs 404 located adjacent the first aperture 302 and the second aperture 402 of the grommet 112, In such embodiments, as material 802 is injected into the channel 114, the buildup of pressure as material 802 is injected into the channel 114 may exert an outwards force onto the interior surface 414 of the grommet 112, which may cause the inwardly located ribs 404 to be displaced outwards, thereby creating a gap between the innermost surfaces of the inwardly located ribs 404 and the wire harness 116 through which material 802 may flow.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below" are merely used to describe the orientation of various elements in the FIGURES. It should be noted that the orientation of various elements may differ according to other exemplary embodiments, and that such variations are intended to be encompassed by the present disclosure.

What is claimed is:

1. A grommet comprising:
a body portion defining a first aperture and a second aperture;
a hollow channel extending between the first aperture and the second aperture, the channel being defined by an interior surface of the body portion;
a port defined by the body portion, the port including:
a first opening defined by an exterior surface of the body portion;
a second opening; and
an injection passageway extending between the first opening and the second opening, the passageway being configured to fluidly couple the hollow channel with an exterior environment; and
a plurality of ribs comprising:
a first rib extending annularly and substantially uninterruptedly radially inwards from the interior surface of the hollow channel at a first location located adjacent the first aperture; and
a second rib extending annularly and substantially uninterruptedly radially inwards from the interior surface of the hollow channel at a second location located adjacent the second aperture;
wherein, the first rib and the second rib are configured to engage an exterior surface of an elongated member inserted into the hollow channel to form a sealed volume into which material may be transmitted through the at least one port defined by the body portion, and
wherein the injection passageway extends through one of the plurality of ribs.

2. The grommet of claim 1, further comprising a filling chamber extending annularly and substantially uninterruptedly about and radially outwards from the interior surface of the hollow channel.

3. The grommet of claim 1, wherein the plurality of ribs further comprises a third rib extending annularly and substantially uninterruptedly radially inwards from the interior surface of the hollow channel.

4. The grommet of claim 3, wherein a location of the third rib corresponds to a portion of the hollow channel at which the second opening of the port is located.

5. The grommet of claim 4, wherein the second opening of the port is defined by a portion of the third rib corresponding to an annular groove defining a filling chamber that extends about an inwardly-most extending portion of an exterior of the third rib.

6. The grommet of claim 1, wherein the second opening of the port is located at a first distance from an axis about which the hollow channel is centered and an innermost portion of the first rib is located at a second distance from the axis, the first distance being greater than the second distance.

7. The grommet of claim 6, further comprising an engagement structure provided on and extending radially outwards from an exterior surface of the body portion.

8. A grommet assembly kit, comprising:
an injectable material; and
a grommet comprising:
a body portion defining a first aperture and a second aperture;
a hollow channel extending between the first aperture and the second aperture, the channel being defined by an interior surface of the body portion and being configured to receive an elongated element therein, the elongated element having a first diameter;
a rib located on and extending inwards from and substantially annularly about the interior surface of the hollow channel at a location along the body portion between the first aperture and the second aperture; and
a port defined by the body portion to receive the injectable material, the port including:
a first opening defined by an exterior surface of the body portion;
a second opening; and
a passageway extending between the first opening and the second opening, the passageway being configured to fluidly couple the hollow channel with an exterior environment;
wherein the passageway extends through the at least one rib.

9. The kit of claim 8, wherein at least a portion of the hollow channel is defined by a second diameter, wherein the second diameter is greater than the first diameter.

10. The kit of claim 9, wherein at least a portion of the hollow channel is defined by a third diameter, wherein the first diameter is greater than the third diameter.

11. The kit of claim 10, wherein at least of a portion of the hollow channel defined by the third diameter corresponds to a portion of the hollow channel at which the rib is located.

12. The kit of claim 8, wherein the second opening of the port is located a first distance from an axis about which the hollow channel is centered, the first distance being greater than a radius of the elongated element.

13. The kit of claim 12, wherein the second opening of the port is defined by a portion of the rib corresponding to an annular groove defining a filling chamber that extends about an inwardly-most extending portion of an exterior of the rib.

14. A method comprising:
providing a grommet comprising:
a body portion defining a first aperture and a second aperture;
a hollow channel extending between the first aperture and the second aperture, the channel being defined by an interior surface of the body portion;
at least one rib located on and extending inwards from and substantially annularly about the interior surface of the hollow channel at a location along the body portion between the first aperture and the second aperture; and
a port defined by the body portion, the port providing fluid communication between the hollow channel and an exterior environment, the port including;
a first opening defined by an exterior surface of the body portion;
a second opening; and
a passageway extending through one of the at least one rib and between the first opening and the second opening, the passageway being configured to fluidly couple the hollow channel with the exterior environment;
positioning a wire element within the hollow channel; and
injecting a material into the hollow channel through the port.

15. The method of claim 14, further comprising inserting a wire through an indentation defined by a thinned-wall portion of a support structure that extends about an exterior surface of the body portion.

16. The method of claim 14, wherein the at least one rib comprises a first at least one rib extending annularly and substantially uninterruptedly radially inwards from the interior surface of the hollow channel at a location located between the first aperture and the port and a second rib extending annularly and substantially uninterruptedly radially inwards from the interior surface of the hollow channel at a second location located between the second opening and the port.

17. The method of claim 16, wherein each of the first rib and the second rib are expanded radially outwards during the positioning of the wire element within the channel.

18. The method of claim 17,
wherein the wire element is one of a plurality of elongated elements,
wherein the plurality of elongated elements are a plurality of wires,
wherein the plurality of wires are separated from one another by a plurality of interstices, wherein, when the material is injected through the port into the hollow channel, the material flows into and substantially fills all of the interstices defined between the wires along at least a portion of the wire element located within the channel, and wherein the material solidifies to present a physical barrier that limits movement of the grommet relative to the plurality of wires.

19. The method of claim 17, wherein each of the first rib and the second rib exerts a compressive force onto an exterior surface of the wire element positioned within the channel.

20. The method of claim 19, wherein the wire element comprises a plurality of wires separated from one another by a plurality of interstices, and wherein the material injected through the port into the hollow channel flows into and substantially fills all of the interstices defined between the wires along at least a portion of the wire element located within the channel.

* * * * *